United States Patent
Mann et al.

(10) Patent No.: US 12,400,387 B2
(45) Date of Patent: Aug. 26, 2025

(54) NEURAL NETWORK FOR AUDIO AND VIDEO DUBBING WITH 3D FACIAL MODELLING

(71) Applicant: Flawless Holdings Limited, London (GB)

(72) Inventors: Scott Mann, Sherman Oaks, CA (US); Rob Hall, London (GB); Hyeongwoo Kim, London (GB)

(73) Assignee: Flawless Holdings Limited, London (GB)

( * ) Notice: Subject to any disclaimer, the term of this patent is extended or adjusted under 35 U.S.C. 154(b) by 29 days.

(21) Appl. No.: 17/852,050

(22) Filed: Jun. 28, 2022

(65) Prior Publication Data
US 2023/0015971 A1   Jan. 19, 2023

Related U.S. Application Data

(60) Provisional application No. 63/203,354, filed on Jul. 19, 2021.

(51) Int. Cl.
| | | |
|---|---|---|
| *G06T 13/20* | (2011.01) | |
| *G06T 13/40* | (2011.01) | |
| *G06T 17/00* | (2006.01) | |
| *G06V 40/16* | (2022.01) | |

(52) U.S. Cl.
CPC ............ *G06T 13/205* (2013.01); *G06T 13/40* (2013.01); *G06T 17/00* (2013.01); *G06V 40/166* (2022.01); *G06V 40/169* (2022.01)

(58) Field of Classification Search
CPC ....... G06T 13/205; G06T 13/40; G06T 17/00; G06V 40/169; G06V 40/166
See application file for complete search history.

(56) References Cited

U.S. PATENT DOCUMENTS

| | | | |
|---|---|---|---|
| 10,593,122 B1 * | 3/2020 | Waggoner | ............... G06T 15/10 |
| 11,461,948 B2 * | 10/2022 | Kuta | ..................... G06T 13/205 |
| 11,581,020 B1 * | 2/2023 | Hadap | .................. G11B 27/036 |

(Continued)

FOREIGN PATENT DOCUMENTS

WO     2021155140 A1    8/2021

OTHER PUBLICATIONS

Kim et al ("Neural Style-Preserving Visual Dubbing" Cornell University, Sep. 5, 2019). (Year: 2019).*

(Continued)

*Primary Examiner* — Kee M Tung
*Assistant Examiner* — Khoa Vu
(74) *Attorney, Agent, or Firm* — EIP US LLP

(57) ABSTRACT

A computer-implemented method includes obtaining source video data comprising a plurality of image frames, and using a face tracker to detect one or more instances of faces within respective sequences of image frames of the source video data. For a first instance of a given face detected within a first sequence of image frames, the method includes determining a framewise location and size of the first instance of the given face in the first sequence of image frames, using a neural renderer to obtain replacement video data comprising a replacement instance of the given face, and using the determined framewise location and size to replace at least part of the first instance of the given face with at least part of the replacement instance of the given face.

17 Claims, 10 Drawing Sheets

(56) References Cited

U.S. PATENT DOCUMENTS

| | | | |
|---|---|---|---|
| 2017/0193286 A1* | 7/2017 | Zhou | G06V 40/172 |
| 2019/0130167 A1* | 5/2019 | Ng | G06V 40/166 |
| 2019/0228580 A1* | 7/2019 | Pelant | G06T 19/006 |
| 2020/0372621 A1* | 11/2020 | Naruniec | G06T 5/77 |
| 2021/0150793 A1 | 5/2021 | Stratton et al. | |
| 2021/0248801 A1 | 8/2021 | Li et al. | |
| 2022/0392166 A1* | 12/2022 | Vesdapunt | G06T 7/50 |
| 2022/0398866 A1* | 12/2022 | Xu | G06V 20/41 |
| 2023/0343010 A1* | 10/2023 | Kwatra | G10L 21/10 |

OTHER PUBLICATIONS

Garrido et al: Reconstruction of Personalized 3D Face Rigs from Monocular Video™ ACM Transactions on Graphics, Sep. 2015.

Tewari et al: "High-Fidelity Monocular Face Reconstruction based on an Unsupervised Model-based Face Autoencoder" IEEE Transactions On Pattern Analysis and Machine Intelligence, 2018.

Kim et al: "Neural Style-Preserving Visual Dubbing" Comnell University, Sep. 5, 2019.

Kim et al: "Deep Video Portraits" Cornell University, May 29, 2018.

\* cited by examiner

NEURAL NETWORK FOR AUDIO AND VIDEO DUBBING WITH 3D FACIAL MODELLING

CROSS-REFERENCE TO RELATED APPLICATIONS

This application claims the benefit of U.S. Provisional Application No. 63/203,354, filed Jul. 19, 2021, under 35 U.S.C. § 119(a). The above-referenced patent application is incorporated by reference in its entirety.

BACKGROUND OF THE INVENTION

This invention relates to the field of machine learning software, and more specifically, to a technique of audio and video dubbing of audiovisual media using a neural network.

Audiovisual media, such as films, movies, and video clips, have been very extremely success mode of communication and entertainment. Large amounts of media have already been created and more media continues to be produced and made available. The digitization of media, and the faster communications speeds (e.g., faster Internet connectivity) have allowed the fast transmission and wider transmission of media.

For even wide distribution of media, it is desirable to provide the media in many different languages, and preferably soon after that media becomes available in its original language. Subtitling is not as desirable as audio dubbing. But with typical audio dubbing techniques, the lips do not synchronize properly with the words being spoken in the dubbed language.

Therefore, there is a need for an improved technique of audio and video dubbing of audiovisual media, especially where the audio and visual dubbing are synchronized better.

BRIEF SUMMARY OF THE INVENTION

An end-to-end process used to visually dub film or television content into a foreign language through the application of a unique workflow and artificial intelligence. Facial data is extracted from the original source video content and is used to train a neural network for each speaking actor. The resultant parametric model is optimized and then used to synthesize photorealistic rendering of facial images that are composited back onto the source video frames. These new images synchronize the lips and facial expressions of the original actors, with the foreign language audio track. The novel techniques embedded within this workflow preserve the performance and idiosyncratic style of the actors, resulting in a more immersive experience for consumers compared to traditional audio dubbing or subtitles. The technique can transform a 2D image to a 3D model.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
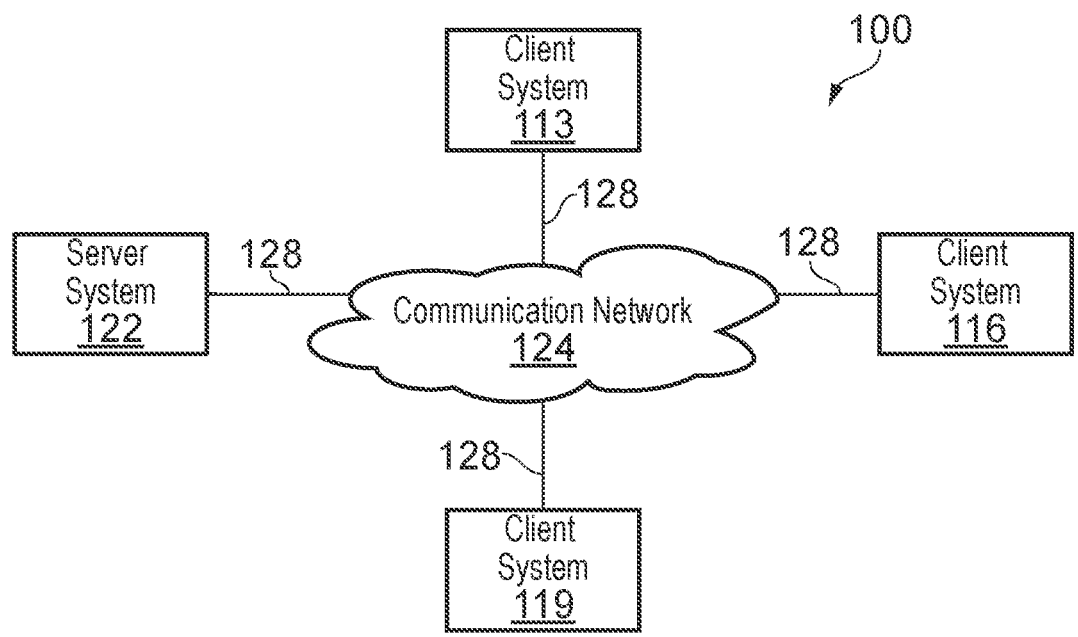
FIG. 1 shows a simplified block diagram of a client-server system and network in which an embodiment of the invention may be implemented.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, the client systems can run as a stand-alone application such as a desktop application or mobile smartphone or tablet application. In another embodiment, a "web browser" application executing on a client system enables users to select, access, retrieve, or query information stored by server system 122. Examples of web browsers include the Internet Explorer and Edge browser programs provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
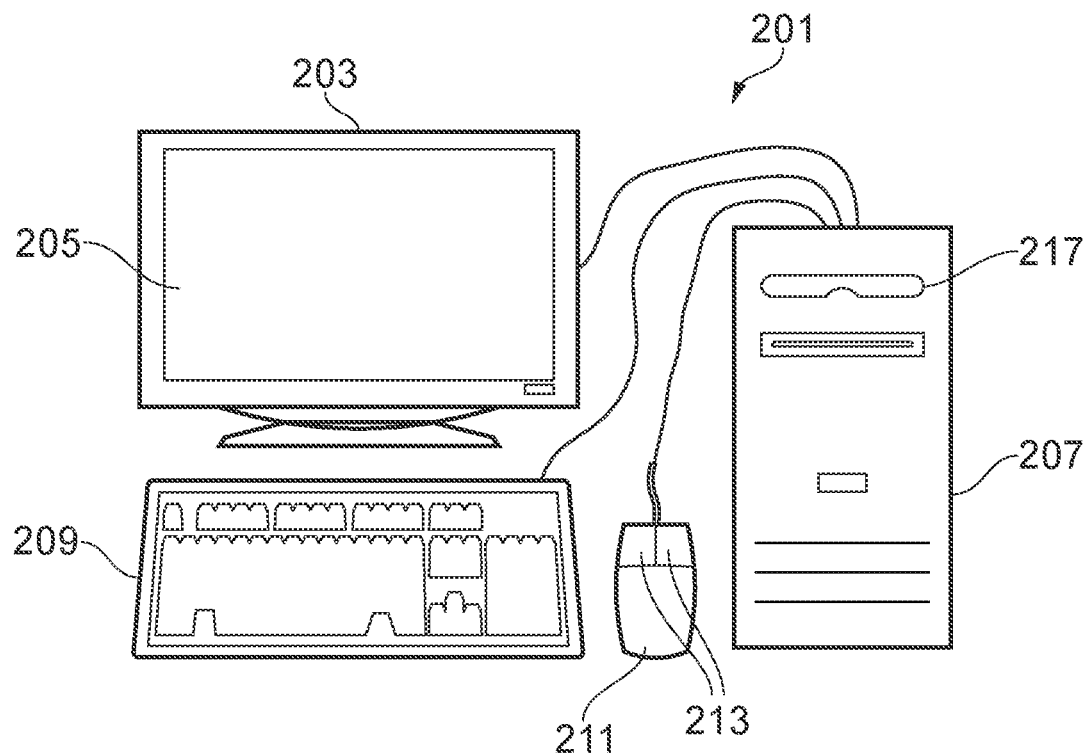
FIG. 2 shows a more detailed diagram of an exemplary client or server computer which may be used in an implementation of the invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 12 and iPhone 12 Pro), Apple iPad (e.g., Apple iPad Air, Apple iPad Pro, or Apple iPad mini), Apple iPod (e.g., Apple iPod Touch), Samsung Galaxy product (e.g., Galaxy S series product or Galaxy Note series product), Google Nexus, Google Pixel devices (e.g., Google Pixel 5), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
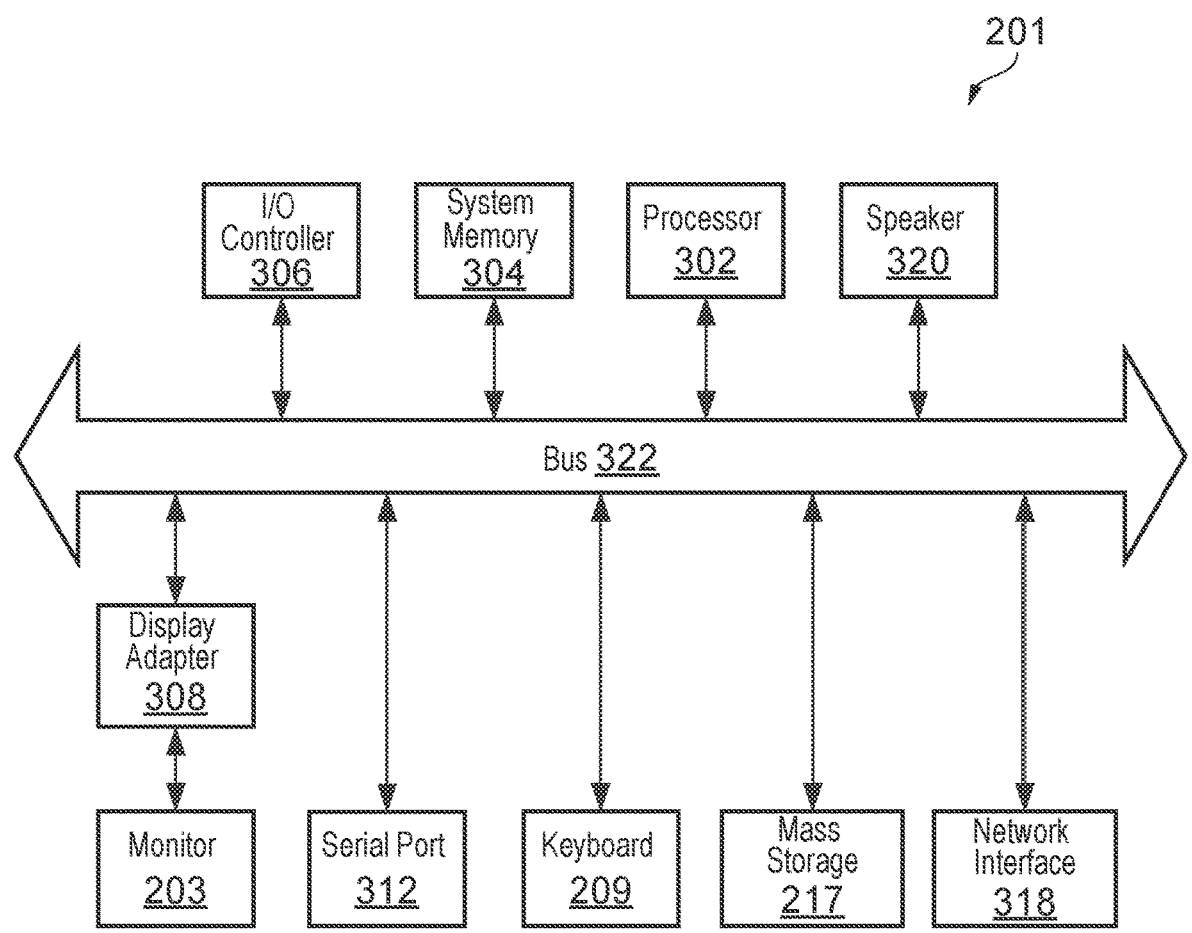
FIG. 3 shows a system block diagram of a client or server computer system used to execute application programs such as a web browser or tools for building a social graph according to the invention.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows 11, Windows CE, Windows Mobile, and Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Any trademarks or service marks used in this patent are property of their respective owner. Any company, product, or service names in this patent are for identification purposes only. Use of these names, logos, and brands does not imply endorsement.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (e.g., IEEE standards 802.11, 802.11a, 802.11b, 802.11e, 802.11g, 802.11i, 802.11n, 802.11ac (e.g., Wi-Fi 5), 802.11ad, 802.11ax (e.g., Wi-Fi 6), and 802.11af, just to name a few examples), near field communication (NFC), radio-frequency identification (RFID), mobile or cellular wireless (e.g., 2G, 3G, 4G, 5G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

Figure 4:
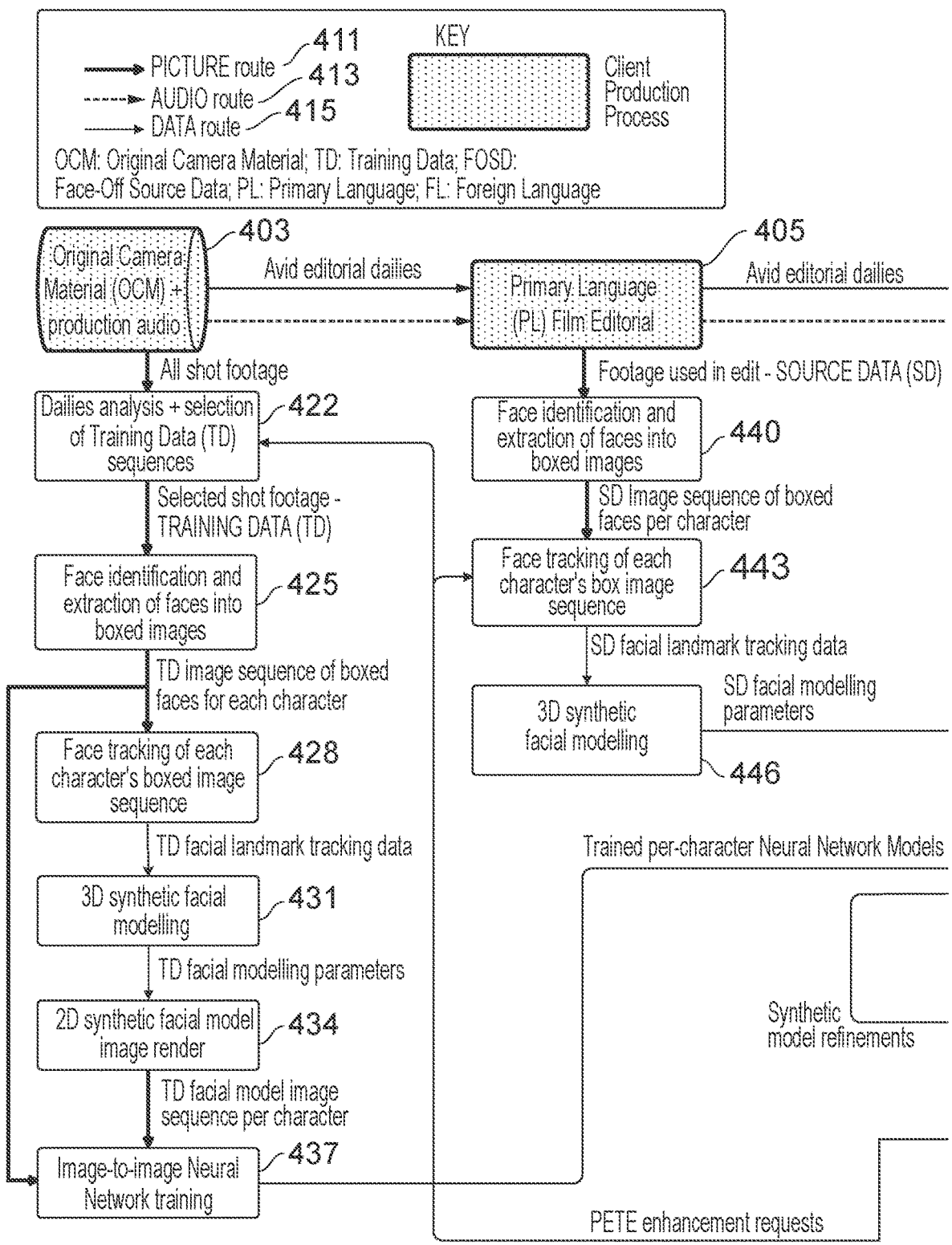
FIG. 4 shows a flow diagram of a video and audio dubbing technique using a neural network.
Figure 4:
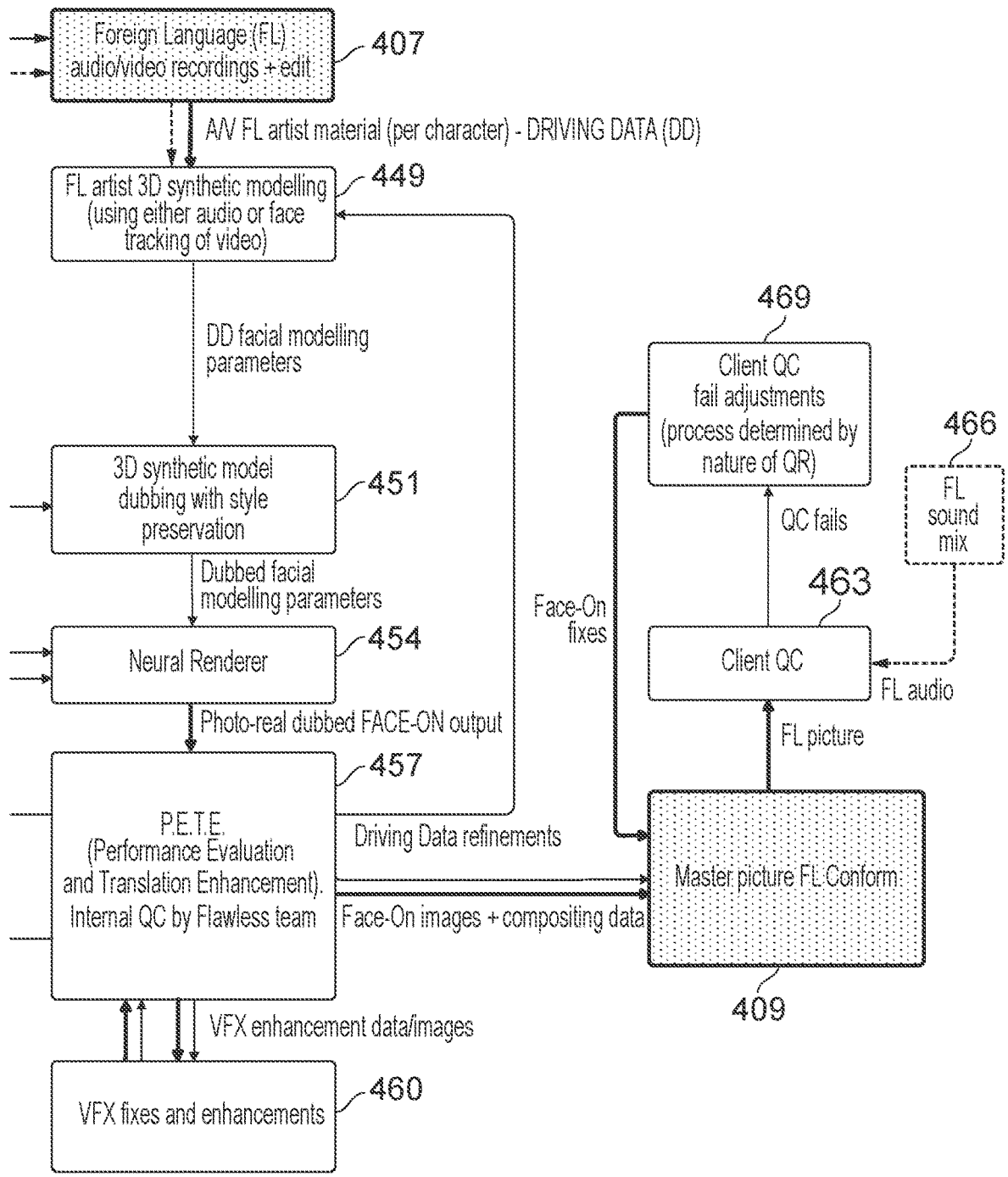

FIG. 4 shows a flow diagram of a video and audio dubbing technique using a neural network. In the figure, OCM refers to original camera material or the original audiovisual content. This can be captured using a camera and directly stored in digital format. Or the video can be computer rendered, such as two-dimensional or three-dimensional content. TD refers to training data. FOSD refers to face-off source data. PL refers to primary language. FL refers to foreign language, or a language other than with the original material or content.

There are client product processes, (403) original camera material (OCM) and production audio, (405) primary language (PL) film editorial, (407) foreign language (FL) audio and video recordings and edit, and (409) master picture FL conform. There are three types of data that are passed between the blocks, picture or video route 411, audio route 413, and data route 415 (which includes data or information other than video and audio).

From block 403 to 405, picture (411) and audio (415) are routed. The picture route includes avid editorial dailies. From block 405 to 407, picture (411) and audio (415) are routed. The picture route includes avid editorial dailies.

From 403, all shot footage (picture 411 data) is routed or connected to (422) dailies analysis and selection of training data (TD) sequences. From 422, selected shot footage or training data (TD) is picture data that is routed to (425) face identification and extraction of faces into boxed images. From 425, TD image sequence of boxed faces for each character (picture data) is routed to (428) face tracking of each character's boxed image sequence. From 428, TD facial landmark tracking data (data 415) is routed to (431) 3D synthetic facial modeling. From 431, TD facial modeling parameters (data 415) are routed to (434) 2D synthetic facial model image render. From 434, TD facial model image sequence per character (picture data) is routed to (437) image-to-image neural network training. For block 437, there is also input from block 425 of TD image sequence of boxed faces for each character.

From 405, footage used in edit or source data (SD) (picture data) is routed to (440) face identification and extraction of faces into boxed images. From 440, SD image sequence of boxed faces per character (picture data) is routed to (443) face tracking of each character's box image sequence. From 443, SD facial landmark tracking data (data 415) is routed to (446) 3D synthetic facial modeling.

From 407, audio and picture data are routed to (449) FL artist 3D synthetic modeling (using either audio or face tracking of video). The picture data include audiovisual FL artist material (per character) or driving data (DD). From 449, DD facial modeling parameters (data 415) to (451) 3D synthetic model dubbing with style preservation. For block 452, there is also input from block 446 of SD facial modeling parameters. From 451, dubbed facial modeling parameters (data 415) are routed to (454) neural renderer. For block 454, there is also input from block 437 of trained per-character neural network models (data 415).

From 454, photo-real dubbed face-on output (picture data) is routed to (457) P.E.T.E. or PETE, which stands for performance evaluation and translation enhancement. There may also be internal quality control checks by team member. Output from PETE 457 can include PETE enhancement requests that are routed to blocks 422 and 443 as input. Output from PETE 457 can include synthetic model refinements routed to block 454. Output from PETE 457 can include driving data refinements routed to block 449. Also from PETE 457, picture data and data 415 (which can include VFX enhancement data and images) are routed to (460) VFX fixes and enhancements. Output from block 460 (e.g., picture and data 415) can be routed back to PETE 457.

Output from PETE 457 are picture and data 415 (e.g., face-on images and compositing data), which are routed as input to block 409 (master picture FL conform). From block 409, FL picture (picture data) is routed to (463) client QC. There can be a block 466, FL sound mix, the product FL audio (audio route 413) that is input to block 463. From 463, QC fails (data 415) is routed to (469) client QC fail adjustments (process determined by nature of QR). From 469, face-on fixes (picture data) is routed to block 409.

A further description of the items referred to by the reference numbers in FIG. 4 is as follows.

Reference number 411—Picture route: The picture route, indicated by blue lines (lines 411 and as described above), represents the flow of image data, either as still frames or video files.

Reference number 413—Audio route: The audio route, indicated by red lines (lines 413 and as described above), represents the flow of audio data, typically as either WAV or AIFF files.

Reference number 415—Data route: The data route, indicated by black lines (lines 415 and as described above), represents the flow of any data that is neither picture nor audio. This can comprise of, as examples, edit decision lists (EDLs), facial landmark data, facial modeling parameters, and neural network models.

Reference number 403—Original Camera Material plus production audio: The original camera material, or OCM, is the video data as captured by a film camera on set. This is the raw data and can be any format, resolution or frame rate, depending on what that particular production has chosen. The production audio refers to the audio recorded on set by the sound recordist and is often referred to as "sync sound." This typically, but not always, takes the form of 24-bit, 48 kilohertz, polyphonic BWAVs. A BWAV, also known as Broadcast Wave Format (BWF), are an extension of the WAV audio format and is the recording format of most file-based nonlinear digital recorders used for motion picture, radio, and television production. It was specified by the European Broadcasting Union in 1997, and updated in 2001 and 2003. It has been accepted as the ITU recommendation ITU-R BS.1352-3, Annex 1, which is incorporated by reference along with all other references cited in this application.

The purpose of the BWF file format is the addition of metadata to facilitate the seamless exchange of sound data between different computer platforms and applications. It specifies the format of metadata, allowing audio processing elements to identify themselves, document their activities, and supports time code to enable synchronization with other recordings. This metadata is stored as extension chunks in a standard digital audio WAV file.

Reference number 405—Primary Language (PL) Film Editorial: The PL Film Editorial refers to the process of editing the film, primarily undertaken by the editor (and their team) plus the director and the producers. This is a creative process and uses fast access to all the shot footage, and for this reason the OCM is transcoded before being passed to the Editorial team to video files of much lower data rates. These files are referred to as "offline" material and the combination of the offline video files and the production audio is referred to as the "Avid editorial dailies" (Avid being the dominant editing software used by film editors).

Reference number 407—Foreign Language (FL) audio and video recordings plus edit: Once the PL edit has been completed, a copy of the film in its primary language is given to the FL team, who will translate it into the many FLs for distribution. Every speaking part is rerecorded using FL artists, and the recordings of all the artists for each FL is edited together for the new FL dialogue tracks. For the Flawless process, these artists are also filmed so there is reference video footage available for the mouth movements and shapes associated with speaking each language.

Reference number 409—Master picture FL conform: The Master picture FL conform is the assembly of the full quality picture, according to the PL edit, plus the visually dubbed faces (Face-on Data) composited back into the image. This assembly is used to generate the master FL outputs for distribution.

Reference number 422—Dailies analysis plus selection of Training Data (TD) sequences: The Flawless team will analyze the Avid editorial dailies and, using face identification, recognition and other analytical tools, create lists (typically in the form of EDLs) of the desired footage for each speaking character in the film that would make the most suitable Training Data—the material that will be sent for neural network training. These lists are used to extract the desired full quality OCM for the training process.

Reference number 425—Face identification and extraction of faces into boxed images: The OCM selected for training goes through face identification (locating the faces in the footage) and extraction (creating new files that are solely square box images around the faces). The boxed faces will typically take the form of sequential image files (rather than video files) and there will typically be one image sequence for each character.

Reference number 428—Face tracking of each character's boxed image sequence: Once each boxed TD image sequence has been created, a precision face tracking process is undertaken to accurately analyze the facial features as each character speaks. The tracking points identified on the faces are referred to as facial landmarks.

Reference number 431—3D synthetic facial modeling: The facial landmark data for each character's boxed image sequence is converted into parameters for a synthetic model.

Reference number 434—2D synthetic facial model image render: The parameters for the synthetic model of each character are used to render a 2D image sequence of the model. Each synthetic model image has a corresponding original boxed image of the character and these pairs are passed to the image-to-image neural network training process.

Reference number 437—Image-to-image neural network training: The neural network training is undertaken discretely for each training sequence, such that one neural network model is formed for each training sequence passed to it. The training sequences may be one per character, or one per character per scene, or otherwise, depending on the source material. The neural network models are formed by looking recursively at each pair of boxed images (original+ model) and learning how to convert the original to the model and vice versa. Once it has formed a model that can do this to a sufficient level of accuracy for all pairs of images in the training sequence, the model is considered sufficiently trained.

Reference number 440—Face identification and extraction of faces into boxed images: After the PL edit is complete, details of the material used in the edit are passed to Flawless (typically in the form of EDLs) and the corresponding OCM used in the edit is extracted to begin the visual dubbing process. This material is the Source Data (SD). The SD goes through face identification (locating the faces in the footage) and extraction (creating new files that are solely square box images around the faces). The boxed faces will typically take the form of sequential image files (rather than video files) and there will typically be one image sequence per character (depending on the source material).

Reference number 443—Face tracking of each character's box image sequence: Once each character's boxed SD image sequence has been created, a precision face tracking process is undertaken to accurately analyze the facial features of each character in their training material. The tracking points identified on the faces are referred to as facial landmarks.

Reference number 446—Three-dimensional (3D) synthetic facial modeling: The facial landmark data for each character's boxed SD image sequence is converted into parameters for a synthetic model. These facial parameters do not need to be rendered as a synthetic model at this stage (unlike the training data in 431 and 434), because this model data represents the model that is to be visually dubbed.

Reference number 449—FL artist 3D synthetic modeling: The audio or video recording, or both, of each of the FL artists is used to form a synthetic model of the FL artist speaking the relevant language. Each FL artist's synthetic model parameter data is referred to as Driving Data (DD) and it is this data that will be used as a guide for the visual dubbing of the original actor.

Reference number 451—3D synthetic model dubbing with style preservation: The parameters of the two facial models used for the dubbing process are the Source Data—the model to be translated—and the Driving Data—the model of the foreign language being spoken. The Source Data model is adjusted using the Driving Data model as reference. Using neural network style preservation, the manner in which the original character forms mouth shapes is retained and therefore their style of speaking is preserved. A new set of parameters, for the dubbed facial model, is generated.

Reference number 454—Neural renderer: The parameters for the dubbed facial model are used to render a corresponding 2D image sequence of the dubbed model. This image sequence is used by the neural renderer to generate a corresponding photo-real image output by applying the corresponding neural network model created in 437. The photo-real images are referred to as Face-on Data.

Reference number 457—P.E.T.E. or PETE: The Performance Evaluation and Translation Enhancement (PETE) process consists of user evaluation of the rendered photo-real outputs. In combination with the FL dialogue edit, the material can be assessed for image quality, lip sync with the FL audio and any artifacts that may use additional processes to correct. Requests for additional processes may consist of, but are not limited to: requesting additional training to take place; requesting retracking of the original or FL artist faces, or a combination; driving data edit adjustments to generate adjusted results; parameter adjustments to the dubbed facial model to generate adjusted results; requests for Visual Effects (VFX) processes to enhance. Once the evaluation within PETE is complete, the Face-on Data can be passed on for recompositing onto the original image.

Reference number 460—VFX fixed and enhancements: Where the Face-on Data may entail additional work that the standard Flawless processes are not fully achieving, the material can be passed to VFX for processing. The VFX process may take the form of adjustments to the Face-on image itself, or involve facial model adjustments that are fed back into the Flawless process, or can be adjustments that will help the Face-on data recomposite back into the original footage more cleanly.

Reference number 463—Client Quality Control (QC): The client quality control process involves reviewing a full quality picture output from the Master FL conform (409) in combination with the relevant FL sound mix. Client approval will be driven by a mutually agreed process.

Reference number 469—Client QC fail adjustments: Any shots or parts of shots in the picture that are identified as QC fails can be fed back through the Flawless process (primarily through PETE but this is dependent on the nature of the cause), reprocessed and re-reviewed until client approval is achieved.

When a film or television program (referred to going forward as just a film) is recorded in its original language (its Primary Language), viewers in other countries that do not speak that language will watch the film using either subtitles (on-screen written translations) to understand the dialogue, or they will watch the dubbed version of the film. The dubbed version is where film has had the dialogue rerecorded in the viewer's language (the Foreign Language) and this dialogue replaces the Primary Language dialogue—an audio-only solution. Both of these viewing experiences are flawed: reading subtitles involves not looking at the action; watching the dubbed version involves the original actors' mouths moving out of sync with the Foreign Language dialogue. Flawless uses Artificial Intelligence (AI) to learn how each of the actors in the film talks to be able to adjust their mouths to move in sync with the Foreign Language. This process is called visual dubbing.

The first stage of the Flawless process involves training the AI in how each actor talks. This is performed by selecting a suitable range of footage from the vast amount that was originally shot for the film. Footage is selected separately for each speaking actor. The selected material is called the Training Data. Going forward we will discuss the process for one actor; in practice, to visually dub an entire film, the process is repeated for every speaking actor in the film.

Once the Training Data has been selected, the actor's face is located and extracted from the Training Data footage and a very precise face-tracking process performed to find and follow the facial features of the actor as they talk. The face-tracking finds facial landmarks—key points on the face—for every frame of footage. There are typically 24 frames (images) recorded for every second of footage.

The facial landmark information for all the footage of the actor is used to generate a 3D synthetic model of the actor's face, with one image of the facial model created for every original image of the actor in the Training Data. Each original frame of the actor is paired with its corresponding facial model image and these pairs are passed to the AI Training Module to gradually learn how to convert the original image to the facial model image and back again. The understanding of how to do this is stored in a Neural Network Model. The training process is considered complete when the Neural Network Model has a sufficiently accurate method of converting between the original actor's image and the facial model image for every frame of Training Data.

While this training process is taking place, the film's production team will, in parallel, be editing the film. This involves taking selected pieces of the filmed footage and assembling them to tell the story in the best way possible. When the editing is complete, the details of what footage is used in the final film are passed to Flawless. Whenever there are actors speaking in the edited footage and we can see their lips moving, we will need to visually dub their mouths.

Each actor's face is identified and extracted from the footage used in the edited film. This footage—the Primary Language footage we need to perform visual dubbing on—is the Source Data. Each actor's Source Data is run through the face-tracking process to track their facial landmarks (as was performed for the training data) and this facial landmark data is used to generate a 3D synthetic model of the actor's face in the Source Data.

When the Foreign Language dubbing actor is recorded, Flawless can use a filming of the dubbing actor's recording. This results in both audio and video recordings of the Foreign Language dubbing actor's performance. This material is the Driving Data—the material that will drive the visual dubbing process. The video and audio of the Driving Data is used to generate a 3D synthetic model of the Foreign Language dubbing actor—either by analyzing the audio and generating a model based solely on the audio analysis, or by analyzing the video—tracking the actor's facial landmarks for each frame—and using that information to generate the synthetic model.

We now have two sets of facial models created—one of the original actor (the Source Data) and one of the Foreign Language dubbing actor (the Driving Data). The facial model of the Foreign Language dubbing actor is used as a guide to reshape the original actor's facial model. This is not a straight replace of the Source Data's mouth movements; a technique known as Style Preservation is undertaken. Style Preservation is an AI-based process that learns how each actor talks and this understanding is what is used in the reshaping of the original actor's facial model, based on how the Foreign Language actor's mouth moved.

Once the reshaping, or dubbing of the original actor's facial model has been performed, the result is a dubbed facial model. This dubbed facial model talks the language of the Foreign Language dubbing actor in the style of the original actor. This dubbed facial model is then passed to a Neural Renderer to convert it to a photo-real image, one frame at a time. The Neural Renderer performs this conversion by using the Neural Network Model developed in the training stage.

The output of the Neural Renderer—the photo-real images of the actor speaking the Foreign Language—is called the Face-On Data. The Face-On Data must be evaluated and any imperfections corrected; this stage is undertaken by P.E.T.E.—Performance Evaluation and Translation Enhancement. The Face-On Data is checked for mouth synchronization with the Foreign Language audio and the image integrity is checked to ensure there is no degradation of the image quality.

Once the Face-On Data has been checked and is deemed to be a good visual dub, it is passed on to the Conform. The conform is the full-quality, master assembly of the edited film. At this stage it has been conformed in its Primary Language. The Face-On Data is combined with—or composited on—the Primary Language imagery to replace the speaking faces and therefore create the new, master, Foreign Language Conform.

The master Foreign Language picture can then be combined with the Foreign Language audio to create the new, visually dubbed, Foreign Language film.

Figure 5:
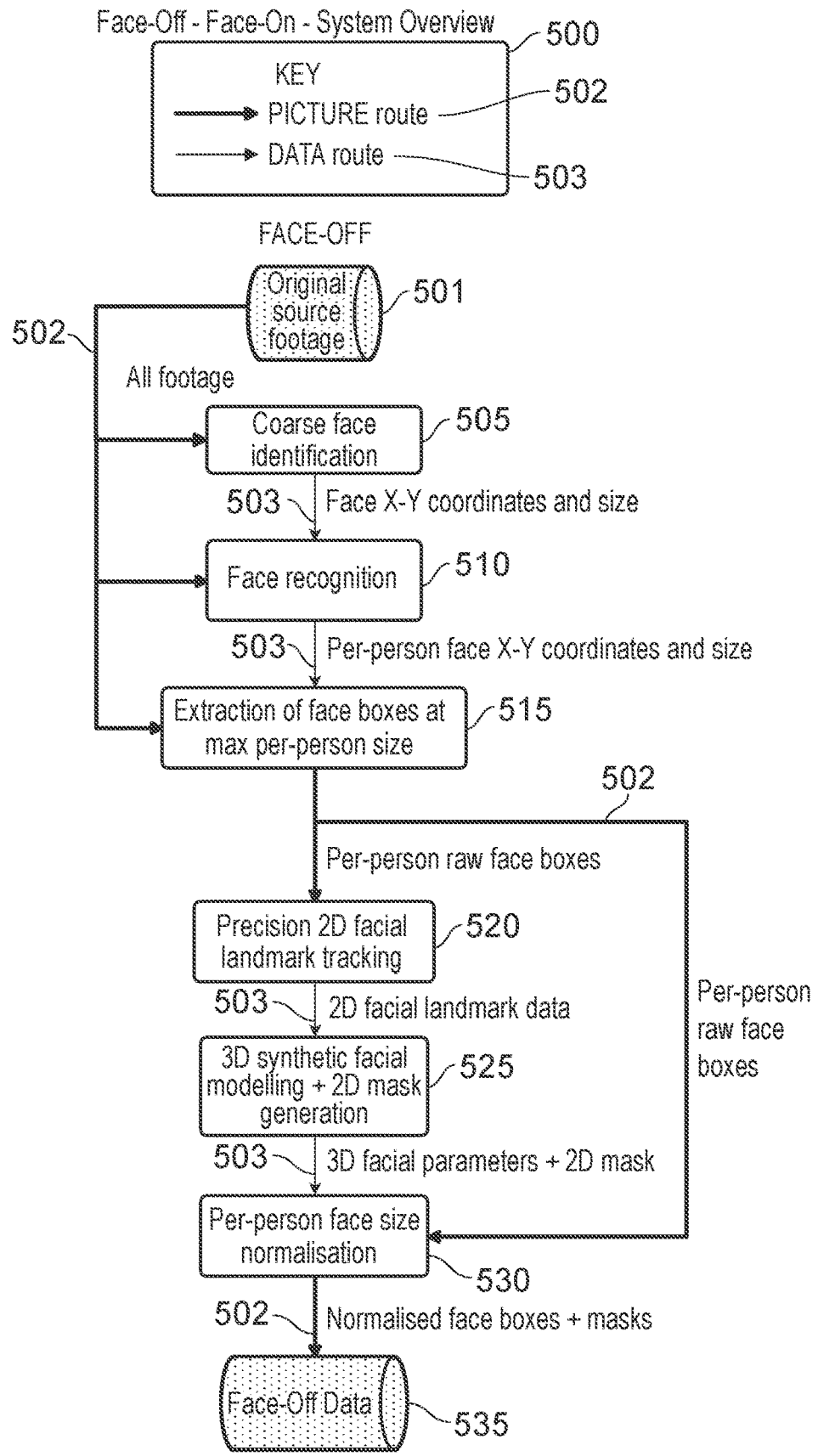
FIG. 5 shows a system overview of a face-off, face-on technique.
Figure 5:
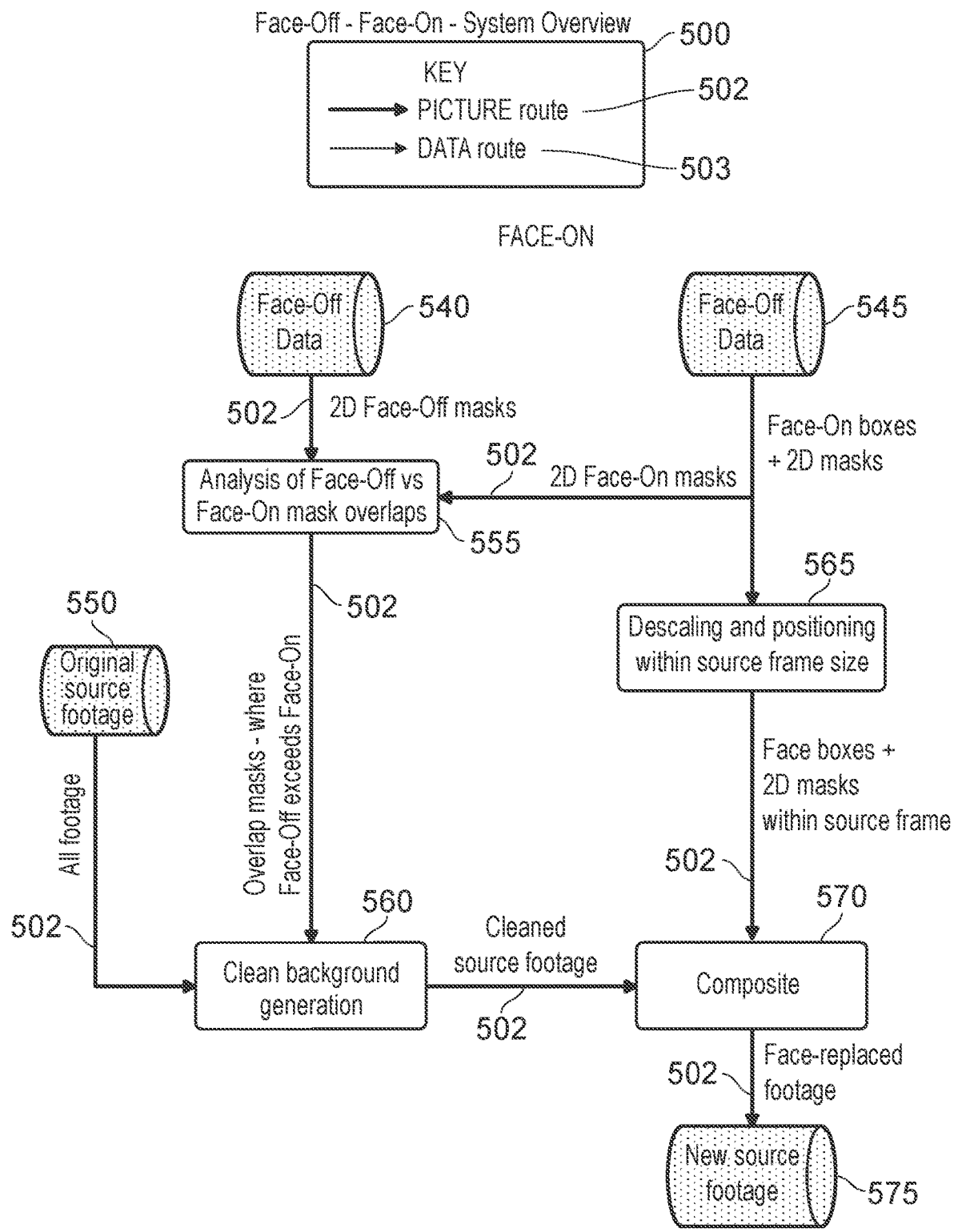

FIG. 5 shows a system overview of a face-off, face-on technique. "Face-Off" refers to the process of extracting face images from source video material and preparing them for visual manipulation techniques such as "TrueSync" visual dubbing. "Face-On" refers to the inverse of "Face-Off"—using the stored "origin" data within the Face-Off files to re-apply (or recomposite) them back on to the original source video material. The novel techniques revolve around the facial landmark tracking of the extracted face and the building of a corresponding 3D model. The geometric analysis of that model is used to centre the head and dynamically adjust its size to create a "normalized" image. This process is performed for every extracted image and made available for visual processing.

The extraction and normalization process information is retained through any visual processing techniques applied to the Face-Off material, to allow "inversion" in the Face-On process and allow the image to be recomposited onto the original source material with the correct position and size.

Reference number 500—PICTURE route and DATA route: The picture route, indicated by blue lines (502), represents the flow of image data, either as still frames or video files. The data route, indicated by black lines (503), represents the flow of any data that is not picture. This can comprise of, as examples, edit decision lists (EDLs), facial landmark data, facial modeling parameters and neural network models.

Reference number 501—Original source footage: The original source footage is the raw, unadjusted video footage to be processed by the "Face-Off" stage—the extraction of faces from the original image. The original source footage may be any video file format but will be processed as an image sequence i.e., on a frame-by-frame basis.

Reference number 505—Coarse face identification: The original source footage is fed to a "coarse" face tracker, whereby it is scanned at speed for the existence of a face and, if one is identified, the X-Y coordinates and the size of the face is determined, therefore creating an effective "box" around the face.

Reference number 510—Face recognition: The processes that Face-Off feeds (such as AI manipulation) are likely to be performed on a person-by-person basis, so once a face has been identified (505), facial recognition must take place by looking at the face inside the face box and trying to identify the person against a known database. This will allow the segregation of Face-Off files by person.

Reference number 515—Extraction of face boxes at max per-person size: Once each face in the original source footage clip has been identified or boxed or recognized for all frames, the maximum detected size of the box over the course of the clip can be determined and used as the face box size to extract each person's face. This way the face of each person is extracted from each frame at a consistent box size across the entire duration of the clip.

Reference number 520—Precision 2D facial landmark tracking: With each person's face from the original source footage extracted and contained in "box" image sequences, more precise face tracking is run to give the most accurate analysis of the face. This tracks the key points of the face (facial landmarks) in the 2D image.

Reference number 525—3D synthetic facial modeling and 2D mask generation: The precise 2D facial landmarks are converted into a 3D space such that an accurate 3D facial model is generated. This serves two purposes—one is for step 530 (normalization) and the other is so that the model can be rendered as a 2D image and a mask generated to show the outline of the face (to be used in step 555).

Reference number 530—Per-person face size normalization: The precise 3D model of the face takes account of head pose and so it is now possible to accurately determine the size of the head in the face box. Using this information, the head size is adjusted such that it is exactly the same size in every frame; this is normalization. The color of the face may also be analyzed and the overall color palette of the face adjusted so that it is consistent throughout the image sequence.

Reference number 535—Face-Off Data: The normalized, per-person face box image sequence is called the Face-Off Data.

Reference number 540—Face-Off Data: This is the normalised, per-person face box image sequences prior to processing by, for example, AI (or A.I.) manipulation techniques.

Reference number 545—Face-On Data: The Face-On Data refers to the Face-Off Data AFTER processing by, for example, AI manipulation techniques.

Reference number 550—Original source footage: The Original source footage is the original, unadjusted video footage prior to Face-Off.

Reference number 555—Analysis of Face-Off vs Face-On mask overlaps: Once the Face-Off Data has been manipulated by, for example, AI processes, to generate the Face-On Data, it is common that there will be instances where the Face-Off Data has facial imagery that exceeds the boundary of the new, manipulated, Face-On Data. For example, where the Face-Off Data had an open mouth and the Face-On Data has a closed mouth, the Face-Off Data's chin would exceed the boundary of the face on the Face-On Data. This will require cleanup processes (560). To determine if this situation has occurred, the 2D mask generated for the Face-Off Data (525) can be compared to the mask associated with the manipulated Face-On Data. The areas where the Face-Off Data mask exceeds the boundaries of the Face-On Data mask are the areas that will need cleanup.

Reference number 560—Clean background generation: The areas requiring cleanup (555) are put through a clean background generation process. This can take place using any existing visual effects technique (e.g., using Boris FX's Mocha Pro) to rebuild backgrounds, necks, clothing, an others, that are being obscured by the original Face-Off Data.

Reference number 565—Descaling and positioning within source frame size: Now that the Face-On Data is ready from an image perspective, the stored metadata in each Face-On Data
image file referring to original X-Y coordinates and box size is used to rescale and reposition the face boxes into a frame size matching that of the original source footage.

Reference number 570—Composite: Each frame of original source footage now has a corresponding Face-On Data frame that has been rescaled and repositioned in a matching frame size. The Face-On Data is laid over the top of the original source footage and the two images combined (composited). Some standard compositing techniques may be applied to ensure that the resultant image is seamless, such as slight softening of the edges of the Face-On Data.

Reference number 575—New source footage: The new source footage is the image sequence resulting from the compositing process in 570.

Figure 6:
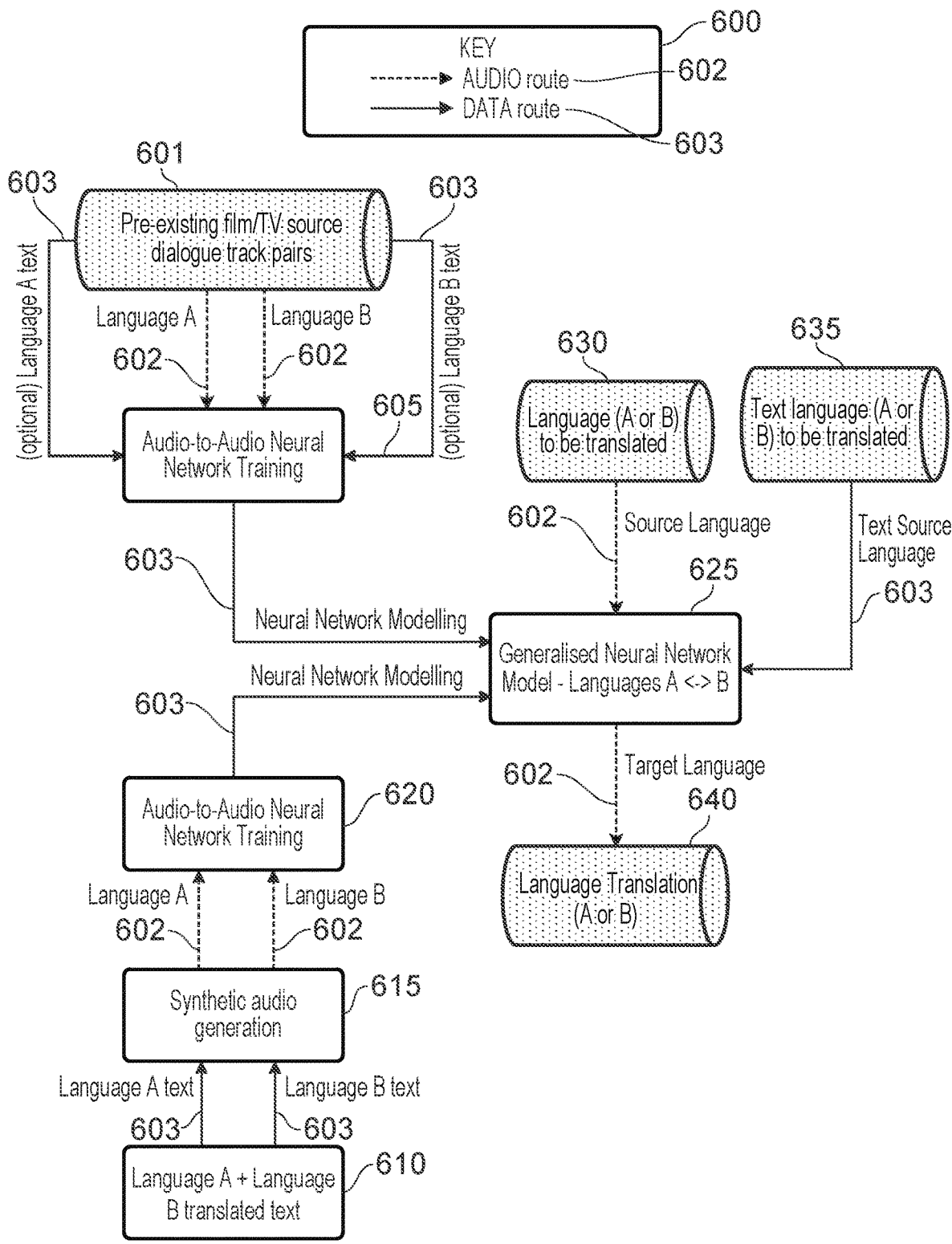
FIG. 6 shows a system overview of an audio performance translation network.

FIG. 6 shows a system overview of an audio performance translation network. The variety of languages contained in international television and film content, for example those stored on the audio tracks of BluRay discs, provides a wealth of material with matching performances between languages from an emotive and contextual perspective. This vast resource of material can be used to train a "generalized" neural network—one for each language-to-language pair—such that, once trained, the audio of a performance in one language can be fed to the neural network and a translation, with matching performance, nuances, and audio characteristics—is generated in the secondary language.

Reference number 600—KEY: The audio route, indicated by red lines (602), represents the flow of audio data, typically in the form of WAV or AIFF files. The data route, indicated by black lines (603), represents the flow of any data that is not picture. This can comprise of, as examples, edit decision lists (EDLs), facial landmark data, facial modeling parameters, and neural network models.

Reference number 601—Preexisting film/TV source dialogue track pairs: The source material for training the network consists of the dialogue audio tracks from preexisting films and television programs. These dialogue tracks make up the primary language (e.g. English) and one of the foreign language dubbing dialogue tracks (e.g. Mandarin). These will typically take the form of uncompressed WAV files. For any given film or television program, many pairs of dialogue tracks can be generated. For example, if there are tracks for English, French, and German, there could be pairs used for English-French, English-German and French-German. The audio files can additionally be supplemented by text documents (typically ASCII files) that transcribe the audio of both languages (along with annotation to indicate the location of the dialogue within the audio file).

Reference number 605—Audio-to-Audio Neural Network Training: The dialogue tracks for each language pairing (e.g., English-Spanish) are fed to a neural network training module (there would be many pairs of these dialogue tracks across the many preexisting films and television programs). Each language pairing dataset would be trained separately. The audio files can additionally be supplemented by the text transcribes of both languages (601) such that the training takes place between language A audio/text and language B audio/text.

Reference number 610—Language A and Language B translated text: To supplement the training dataset (601), it is possible to generate text files and translations of those text files, along with annotations to indicate synchronization between the two. These are passed to 615.

Reference number 615—Synthetic audio generation: The text files generated in 610 are then run through synthetic audio generation to create the corresponding dialogue audio tracks. A new (synthetic) training dataset has now been created—the language A-plus-B audio-plus-text files.

Reference number 620—Audio-to-Audio Neural Network Training: As per 605, the neural network training on the dataset created in 615 can take place to supplement the neural network model creation.

Reference number 625—Generalized Neural Network Model—Languages A↔B: The Generalized neural network model generated by the training (605, 620) is a model that has learned the relationship between the two languages in the pair and, optionally, the text relationship that corresponds to this pair.

Reference number 630—Language (A or B) to be translated: The material to use as source data i.e., to translate once the neural network model has been generated consists of an audio file (typically a WAV or AIFF) that is spoken in either of the languages in the language pair that the model was trained on.

Reference number 635—Text language (A or B) to be translated: If the neural network model was trained on datasets that included the text transcriptions of the audio files as well as the audio files themselves, then it is possible that a text file in one of the languages can be translated to an audio or text output (640). These text files typically take the form of an ASCII text file.

Reference number 640—Language Translation (A or B): The output of the generalized neural network model can be either a translated audio output or a translated text output, depending on what relationships were established via the datasets in the training stage. These outputs would typically be a WAV file or an ASCII text file.

Figure 7:
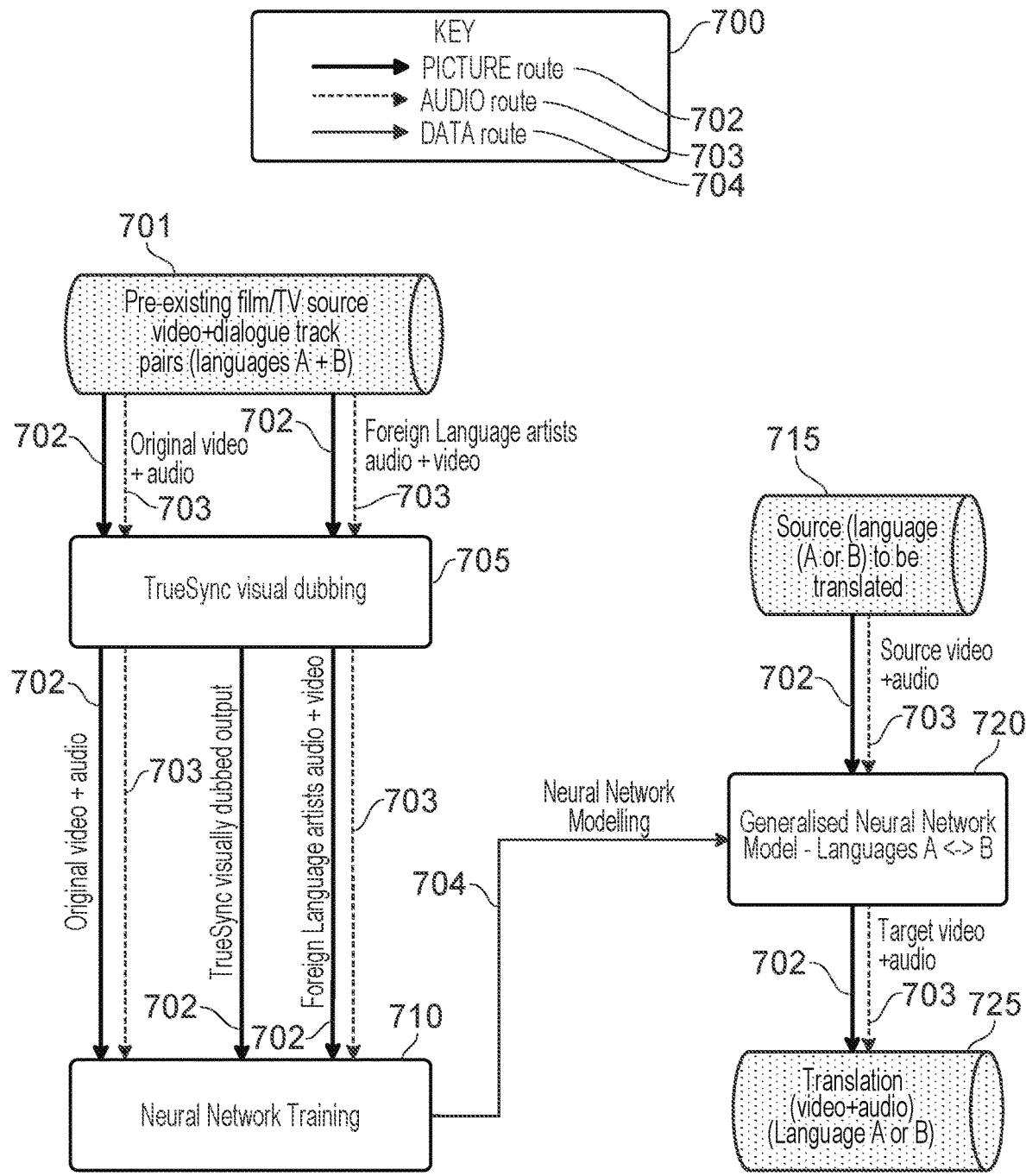
FIG. 7 shows a system overview of video and audio performance translation network.

FIG. 7 shows a system overview of video and audio performance translation network. The variety of languages contained in international television and film content, for example those stored on the audio tracks of BluRay discs, provides a wealth of material with matching performances between languages from an emotive and contextual perspective. This vast resource of material can be used to train a "generalized" neural network—one for each language-to-language pair—such that, once trained, the audio of a performance in one language can be fed to the neural network and a translation, with matching performance, nuances, and audio characteristics—is generated in the secondary language. This audio translation can be combined with a visual language-to-language pair by visually dubbing the original image using the TrueSync process to create a Foreign Language visual output. The neural network therefore has both audio and video references for the both languages and, once trained, will allow the audio-visual dubbing of any material into the foreign language of choice.

Reference number 700—KEY: The picture route, indicated by blue lines (702), represents the flow of image data, either as still frames or video files. The audio route, indicated by red lines (703), represents the flow of audio data, typically in the form of WAV or AIFF files. The data route, indicated by black lines (704), represents the flow of any data that is not picture. This can comprise of, as examples, edit decision lists (EDLs), facial landmark data, facial modeling parameters, and neural network models.

Reference number 701—Preexisting film or TV source video-plus-dialog track pairs (languages A-plus-B): The source material for the network consists of preexisting films and television programs that are to be visually dubbed into a foreign language (in this case by the TrueSync process but by any available visual dubbing system). The source material consists of the video and original language audio of the film or TV program PLUS the audio and video recording of the Foreign Language dubbing artists, in sync with the original video/audio. Note that (a) the video will be processed frame-by-frame as an image sequence rather than as a video stream and (b) only one language pair at a time can be processed.

Reference number 705—TrueSync visual dubbing: The TrueSync visual dubbing process (or similar visual dubbing process if available) requires video-plus-audio of the film or TV program to be translated (the source data) plus the video and audio of the foreign language artists for the given secondary language in question (the driving data). The original video is then visually dubbed to generate new video footage of the artist speaking the foreign language audio. This visually dubbed footage is output from the TrueSync system as a new image sequence.

Reference number 710—Neural Network Training: The original video-plus-audio of the film or TV program PLUS the visually dubbed film or TV program PLUS the Foreign Language artists' video-plus-audio is all passed to a neural network training model to learn the audio-visual relationship between one language and the other.

Reference number 715—Source (language A or B) to be translated: The source material to be translated consists of video+audio footage of anyone speaking in one of the languages that the neural network model (720) has been trained on.

Reference number 720—Generalized Neural Network Model—Languages A↔B: The training in 710 results in a generalized neural network model (once the training has taken place over a sufficiently large dataset). This model understands the relationship between people speaking in one language (video-plus-audio) and the corresponding version of that person speaking in a foreign language.

Reference number 725—Translation (video-plus-audio) (Language A or B): The output of the generalized neural network model is the video (as an image sequence) and audio translation of the source material (715).

Figure 8:
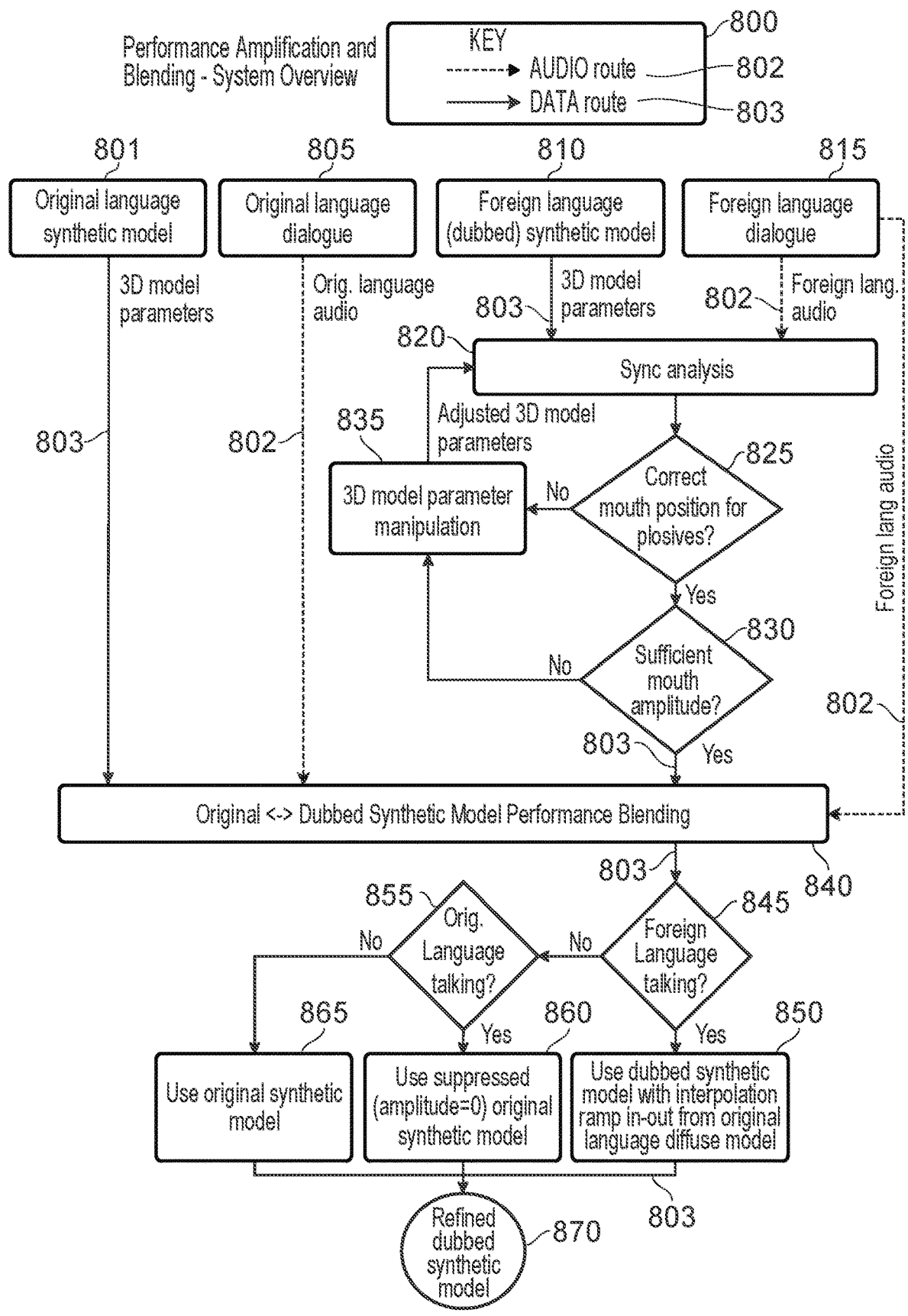
FIG. 8 shows a system overview of performance amplification and blending.

FIG. 8 shows a system overview of performance amplification and blending. The "TrueSync" visual dubbing process uses a 3D synthetic face model, firstly generated as a representation of an original 2D face and then manipulated (using visual dubbing techniques) to generate a new 3D synthetic face model. For the TrueSync process, this manipulate is to generate a model that is speaking a different language. Any deviation from a perfect representation of the foreign language speech must be corrected.

There are two main methods for this: performance amplification and performance blending: Performance amplification refers to the 3D synthetic face model parameter adjustments to create more emphatic mouth movements and therefore give more definition to the dubbed model. As well as "enlarging" mouth movements, it can also be used to "tighten" mouth movements, for example to hit a "plosive" sound (e.g. a "P") more distinctly.

Performance blending refers to the use of smooth interpolated transitions between original performance and visually dubbed performance—the basis of visual dubbing is to retain as much of the original performance as possible and so it is necessary to smoothly transition in and out of nondialog moments.

Reference number 800—KEY: The audio route, indicated by red lines (802), represents the flow of audio data, typically in the form of WAV or AIFF files. The data route, indicated by black lines (803), represents the flow of any data that is not picture. This can comprise of, as examples, edit decision lists (EDLs), facial landmark data, facial modeling parameters, and neural network models.

Reference number 801—Original language synthetic model: The original language synthetic model is the 3D representation of the face to be translated. This is typically stored as a file of parameters that represent the facial structure, Euler angle, lighting, and Albedo characteristics and can be rendered as a 2D image if necessary.

Reference number 805—Original language dialogue: The original language dialogue is the audio file (typically stored as a WAV or AIFF file) associated with the original language synthetic model (801).

Reference number 810—Foreign language (dubbed) synthetic model: The foreign language (dubbed) synthetic model is the synthetic model from step 801 that has been adjusted such that the model is now speaking in a foreign language. The adjustment to the synthetic model has typically taken place within a visual dubbing system such as TrueSync. The model is typically stored as a file of parameters that represent the facial structure, Euler angle, lighting and Albedo characteristics and can be rendered as a 2D image if necessary.

Reference number 815—Foreign language dialogue: The foreign language dialogue is the audio file (typically stored as a WAV or AIFF file) associated with the foreign language (dubbed) synthetic model (810).

Reference number 820—Sync analysis: The Sync analysis is a human process whereby the foreign language synthetic model and its corresponding audio are played back to the user together to assess for correct sync. This is an iterative process—decisions are posed in sections 825, 830, and 835 and potentially require reanalysis after addressing the outcome of those decisions.

Reference number 825—Correct mouth position for plosives? The "plosives" within the foreign language need the correct mouth shape. Plosives consists of, for example, the consonants B, M, and P.

Reference number 830—Sufficient mouth amplitude? The size that the synthetic mouth is opening needs to match the audio—this is based on the "feeling" of the user—it should of course match (because the video of the foreign language artists saying the dialogue has been used in the generation of the foreign language diffuse model). However, the original language performance needs to be taken into consideration so that there may be adjustments in that respect; tracking variations and style preservation involved in the visual dub may also require refinement.

Reference number 835—3D model parameter manipulation: If the answer to 825 or 830 was "no" then the parameters for the foreign language 3D parameter file are adjusted to "push or pull" the model's mouth movements into the correct shape at the correct moment.

Reference number 840—Original↔Dubbed Synthetic Model Performance Blending: When the foreign language synthetic model has good sync for moments when the person is speaking, the blending of performance between the original and foreign language models can take place. This involves ramping to or from the original synthetic model between lines of dialogue to maximize full original performance. This ramping (or "blending") decision making process is covered in steps 845, 850, 855, 860, and 865.

Reference number 845—Foreign Language talking? If the foreign language audio track has dialogue being spoken, then step 850 should be actioned. Otherwise step 855 should be actioned.

Reference number 850—Use dubbed synthetic model with interpolation ramp in-out from original language diffuse model: If the foreign language model is speaking at the moment being examined, then the foreign language model should be retained for that moment. A "ramp" from or to the original synthetic model should be applied at the start and end of the foreign language dialogue such that we are using the foreign language model only where needed.

Reference number 855—Orig Language talking? If the original language model is speaking at the moment being examined (while the foreign language model is not speaking) then step 860 should be actioned. If not, then step 865 should be actioned.

Reference number 860—Use suppressed (amplitude=0) original synthetic model: If the original language model is speaking at a time when the foreign language model is not speaking, then the original language dialogue must be suppressed by forcing the "amplitude" of the model's mouth movement to zero.

Reference number 865—Use original synthetic model: If neither the original language model nor the foreign language model are speaking then the original language model should be used. This will therefore retain the full original performance where possible.

Reference number 870—Refined dubbed synthetic model: Now that the foreign language model is (a) good sync and (b) used only where necessary, the resultant synthetic model is now output as a new 3D parameter file for the "refined" dubbed synthetic model.

Figure 9:
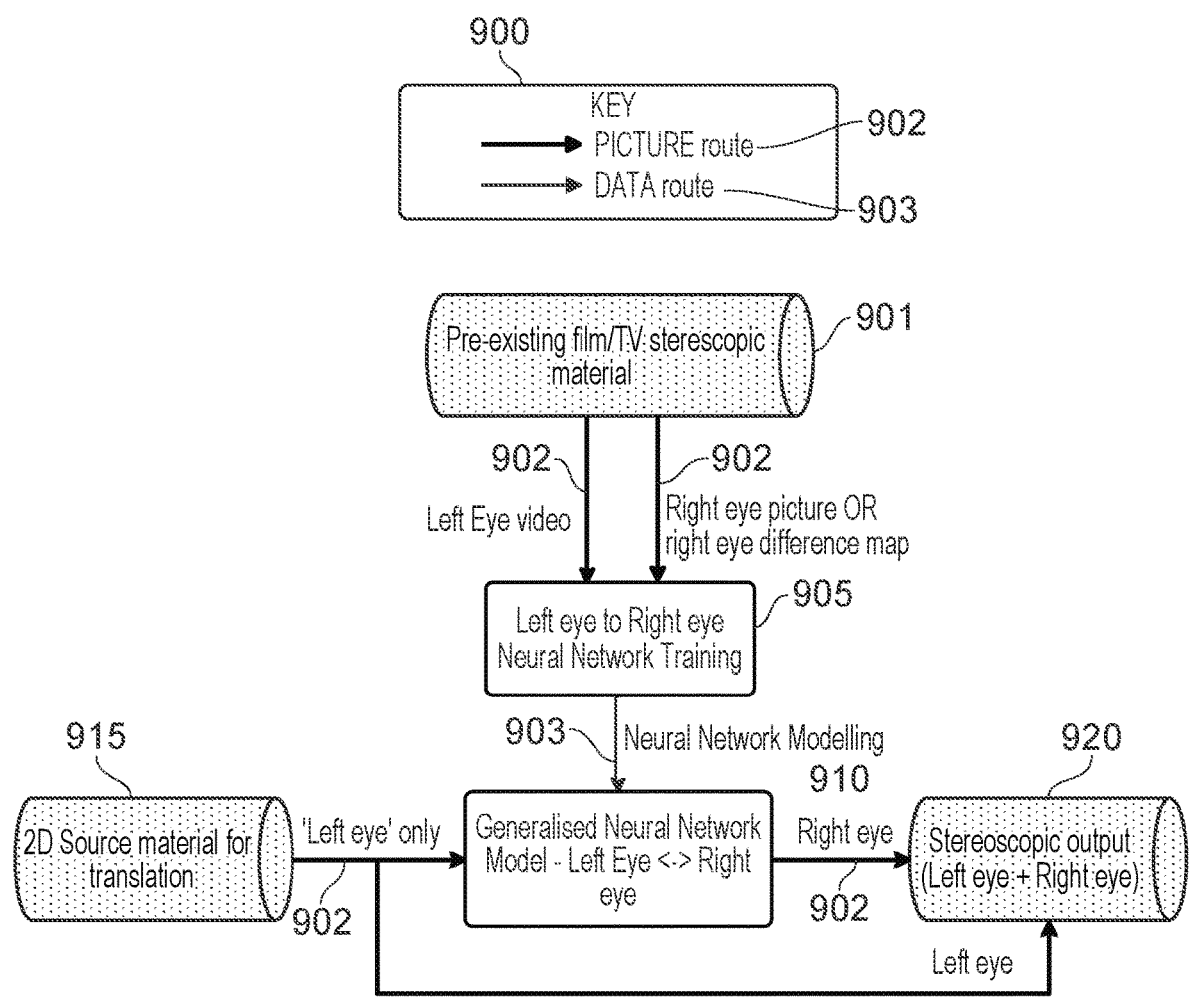
FIG. 9 shows a system overview of 2D to stereoscopic network.

FIG. 9 shows a system overview of 2D to stereoscopic network. Typical 3D, or stereoscopic, film and television content consists of either discrete left and right eye images, or a left eye and "right eye difference" image, displayed such that the viewer interprets a 3-dimensional image. The production of these pairs of images can take place either by filming "natively" in 3D—using two camera side-by-side to simulate the perspective of human eyes—or by shooting with one camera in 2D and using a large team of artists to manually "cut out" elements of the image so they can be placed in three-dimensional space—and artificially create the second eye.

By feeding the wealth of stereoscopic content available from existing film and television to a neural network, it can learn the relationship between the two eyes over such a broad range of material that it can generate the subtle differences necessary to create a secondary eye when fed a single eye, therefore generating a 2D to stereoscopic conversion automatically.

Reference number 900—KEY: The picture route, indicated by blue lines (902), represents the flow of image data, either as still frames or video files. The data route, indicated by black lines (903), represents the flow of any data that is not picture. This can comprise of, as examples, edit decision lists (EDLs), facial landmark data, facial modeling parameters, and neural network models.

Reference number 901—Preexisting film or TV stereoscopic material: The material to be processed by the network consists of preexisting 3D, or stereoscopic, television programs or films. Stereoscopic material is stored in one of two ways: (i) as two separate images, the left eye and right eye images, squeezed to half width and contained together in a single full-width image, or (ii) as one full width image, typically the left eye image, plus a second data stream representing the difference map to indicate the difference between the left eye and right eye images. This is a technique used for reducing the amount of data required to represent the stereoscopic image.

Reference number 905—Left eye to Right eye Neural Network Training: The left eye and right eye data is fed to a neural network training module where, over a large training dataset, the relationship between the left eye and right eye is learned.

Reference number 910—Generalized Neural Network Model—Left Eye↔Right eye: The neural network training develops a Generalized neural network model that, when provided an image sequence for a single eye, can analyze the depth of the image and generate a second image sequence for the corresponding other eye.

Reference number 915—2D Source material for translation: The 2D source material for translation refers to the image sequence provided to the generalized neural network model that represents a single eye i.e., a 2D image.

Reference number 920—Stereoscopic output (Left eye plus Right eye): The stereoscopic output, is the pair of image sequences representing the left eye and right eye; one eye was the source material for translation (915) and the other eye was generated by the generalized neural network model (910).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A computer-implemented method comprising:
    obtaining source video data comprising a plurality of image frames;
    detecting, using a face tracker, one or more instances of faces within respective sequences of image frames of the source video data; and
    for a first instance of a given face detected within a first sequence of image frames of the source video data:
        determining a framewise location and size of the first instance of the given face in the first sequence of image frames;
        obtaining, using a neural renderer, replacement video data comprising a replacement instance of the given face;
        obtaining first mask data indicating a framewise shape of at least part of the replacement instance of the given face;
        obtaining second mask data indicating a framewise shape of at least part of the first instance of the given face, the framewise shape indicated by the first mask data differing from the framewise shape indicated by the second mask data for at least some image frames; and
        replacing, using the determined framewise location and size, the at least part of the first instance of the given face in the first sequence of image frames with the at least part of the replacement instance of the given face,
        wherein the replacing comprises:
            determining, based on a comparison between the first mask data and the second mask data, that a boundary of the at least part of the first instance of the given face exceeds a boundary of the at least part of the replacement instance of the given face;
            based on said determining that the boundary of the at least part of the first instance of the given face exceeds the boundary of the at least part of the replacement instance of the given face, performing clean background generation in a region of the sequence of image frames between the boundary of the at least part of the first instance of the given face and the boundary the at least part of the replacement instance of the given face;
            rescaling and repositioning the replacement instance of the given face to match the determined framewise location and size of the first instance of the given face; and
            compositing the rescaled and repositioned replacement instance of the given face with the source video data.

2. The computer-implemented method of claim 1, comprising:
    processing at least a portion of each image frame of the first sequence of image frames to generate a three-dimensional synthetic model of the first instance of the given face; and
    determining the framewise shape of the at least part of the first instance of the given face based on a framewise shape of a corresponding at least part of the generated three-dimensional synthetic model.

3. The computer-implemented method of claim 1, wherein obtaining the replacement video data comprises:
    for one or more respective instances of the given face detected within respective sequences of image frames of the source video data:
        processing at least a portion of each image frame of the respective sequence of image frames to generate a three-dimensional synthetic model of the respective instance of the given face
        generating a respective sequence of synthetic images from a three-dimensional synthetic model of the respective instance of the given face; and
        training the neural renderer to reconstruct the respective instance of the given face using the respective sequence of synthetic images; and
    for a three-dimensional synthetic model of the first instance of the given face:
        modifying the three-dimensional synthetic model;
        generating a first sequence of synthetic images from the modified three-dimensional synthetic model; and
        generating the replacement video data using the trained neural renderer and the generated first sequence of synthetic images.

4. The computer-implemented method of claim 3, further comprising, for each of the one or more respective instances of the given face:
    determining a framewise location of a box containing the respective instance of the given face within the respective sequences of image frames; and
    determining the at least a portion of each image frame of the respective sequences of image frames as a portion contained within the box.

5. The computer-implemented method of claim 4, further comprising determining a size of the box such that the respective instance is contained within the box for all image frames of the respective sequence of image frames.

6. The method of claim 3, wherein for each of the one or more respective instances of the given face, generating the three-dimensional synthetic model comprises tracking facial landmarks of the respective instance of the given face and generating the three-dimensional synthetic model in dependence on locations of the tracked facial landmarks.

7. The computer-implemented method of claim 3, further comprising, for each of the one or more respective instances of the given face:
    determining, using the generated three-dimensional synthetic model, a pose of the respective instance of the given face for each image frame of the respective sequence of image frames; and
    normalizing, using the determined pose for each image frame of the respective sequence of image frames, the respective instance of the given face to be a substantially constant size between the respective sequence of image frames.

8. The computer-implemented method of claim 3, comprising:
performing facial recognition to determine identities for the one or more detected instances of faces;
identifying a plurality of respective instances of the given face as having a common identity; and
training the neural renderer to reconstruct the plurality of respective instances of the given face identified as having a common identity.

9. The computer-implemented method of claim 8, wherein:
the first instance of the given face is an instance of the given face speaking in a first language; and
the audio and/or video recording is of speech in a second language different to the first language.

10. The computer-implemented method of claim 8, wherein modifying the three-dimensional synthetic model comprises progressively transitioning between unmodified parameter values for the three-dimensional synthetic model and the modified parameter values for the three-dimensional model in dependence on when speech is taking place in the driving data.

11. The computer-implemented method of claim 8, wherein modifying the three-dimensional synthetic model comprises modifying a mouth shape of the three-dimensional synthetic model to match a plosive detected in the driving data.

12. The computer-implemented method of claim 3, wherein modifying the three-dimensional synthetic model comprises:
obtaining driving data comprising an audio and/or video recording including speech;
processing the driving data to determine modified parameter values for the three-dimensional synthetic model corresponding to the speech; and
using the modified parameter values to modify the three-dimensional synthetic model.

13. The computer-implemented method of claim 3, wherein modifying the three-dimensional synthetic model comprises:
determining when the first instance of the given face is speaking; and
reducing an amplitude of mouth movements of the three-dimensional synthetic model when it is determined that the first instance of the given face is speaking.

14. The computer-implemented method of claim 3, further comprising adjusting a color palette of the first instance of the given face to be consistent throughout the first sequence of image frames.

15. The computer-implemented method of claim 1, wherein replacing the at least part of the first instance of the given face with the at least part of the replacement instance of the given face comprises softening an edge of the at least part of the replacement instance of the given face.

16. A system comprising one or more processors and one or more non-transient storage media storing machine readable instructions which, when executed by the one or more processors, cause the one or more processors to carry out operations comprising:
obtaining source video data comprising a plurality of image frames;
detecting, using a face tracker, one or more instances of faces within respective sequences of image frames of the source video data; and
for a first instance of a given face detected within a first sequence of image frames of the source video data:
determining a framewise location and size of the first instance of the given face in the first sequence of image frames;
obtaining, using a neural renderer, replacement video data comprising a replacement instance of the given face;
obtaining first mask data indicating a framewise shape of at least part of the replacement instance of the given face;
obtaining second mask data indicating a framewise shape of at least part of the first instance of the given face, the framewise shape indicated by the first mask data differing from the framewise shape indicated by the second mask data for at least some image frames; and
replacing, using the determined framewise location and size, the at least part of the first instance of the given face in the first sequence of image frames with the at least part of the replacement instance of the given face,
wherein the replacing comprises:
determining, based on a comparison between the first mask data and the second mask data, that a boundary of the at least part of the first instance of the given face exceeds a boundary of the at least part of the replacement instance of the given face;
based on said determining that the boundary of the at least part of the first instance of the given face exceeds the boundary of the at least part of the replacement instance of the given face, performing clean background generation in a region of the sequence of image frames between the boundary of the at least part of the first instance of the given face and the boundary of the at least part of the replacement instance of the given face;
rescaling and repositioning the replacement instance of the given face to match the determined framewise location and size of the first instance of the given face; and
compositing the rescaled and repositioned replacement instance of the given face with the source video data.

17. One or more non-transient storage media comprising machine readable instructions which, when executed by one or more processors, cause the one or more processors to carry out operations comprising:
obtaining source video data comprising a plurality of image frames;
detecting, using a face tracker, one or more instances of faces within respective sequences of image frames of the source video data; and
for a first instance of a given face detected within a first sequence of image frames of the source video data:
determining a framewise location and size of the first instance of the given face in the first sequence of image frames;
obtaining, using a neural renderer, replacement video data comprising a replacement instance of the given face;
obtaining first mask data indicating a framewise shape of at least part of the replacement instance of the given face;
obtaining second mask data indicating a framewise shape of at least part of the first instance of the given face, the framewise shape indicated by the first mask data differing from the framewise shape indicated by the second mask data for at least some image frames; and replacing, using the determined framewise location and size, the at least part of the first instance of the given face in the first sequence of image frames with the at least part of the replacement instance of the given face, wherein the replacing comprises:
- determining, based on a comparison between the first mask data and the second mask data, that a boundary of the at least part of the first instance of the given face exceeds a boundary of the at least part of the replacement instance of the given face;
- based on said determining that the boundary of the at least part of the first instance of the given face exceeds the boundary of the at least part of the replacement instance of the given face, performing clean background generation in a region of the sequence of image frames between the boundary of the at least part of the first instance of the given face and the boundary of the at least part of the replacement instance of the given face;
- rescaling and repositioning the replacement instance of the given face to match the determined framewise location and size of the first instance of the given face; and
- compositing the rescaled and repositioned replacement instance of the given face with the source video data.

* * * * *